(12) United States Patent
Bolin et al.

(10) Patent No.: US 11,573,481 B1
(45) Date of Patent: Feb. 7, 2023

(54) REVOLVING PHOTOGRAPHY STUDIO

(71) Applicants: Rebecca Bolin, Houston, TX (US); Adam Bolin, Houston, TX (US)

(72) Inventors: Rebecca Bolin, Houston, TX (US); Adam Bolin, Houston, TX (US)

(73) Assignee: DN IP Holdings LLC, Houston, TX (US)

( * ) Notice: Subject to any disclaimer, the term of this patent is extended or adjusted under 35 U.S.C. 154(b) by 0 days.

(21) Appl. No.: 17/516,693

(22) Filed: Nov. 1, 2021

(51) Int. Cl.
*G03B 17/56* (2021.01)
*G03B 15/06* (2021.01)
*E04B 1/346* (2006.01)

(52) U.S. Cl.
CPC .............. *G03B 17/56* (2013.01); *E04B 1/346* (2013.01); *G03B 15/06* (2013.01)

(58) Field of Classification Search
CPC ........ G03B 17/56; G03B 15/00; G03B 15/06; E04B 1/346
USPC .......................................................... 396/1, 3
See application file for complete search history.

(56) References Cited

U.S. PATENT DOCUMENTS

| | | | |
|---|---|---|---|
| 332,762 A | 12/1885 | Thompson | |
| 4,545,630 A * | 10/1985 | Izumi | G01G 21/28 312/285 |
| 7,307,737 B1 | 12/2007 | Kling, III | |
| 8,112,325 B2 | 2/2012 | Foy et al. | |
| 9,046,740 B1 * | 6/2015 | Smithweck | G03B 15/06 |
| 9,369,679 B2 | 6/2016 | Arfvidsson et al. | |
| 9,408,540 B2 | 8/2016 | Mueller et al. | |
| 9,412,203 B1 | 8/2016 | Garcia, III et al. | |
| 9,641,730 B2 | 5/2017 | Rosenberry et al. | |
| 9,998,663 B1 | 6/2018 | François et al. | |
| 10,261,394 B2 | 4/2019 | Zilban et al. | |
| 10,284,794 B1 | 5/2019 | Francois et al. | |
| 10,573,012 B1 | 2/2020 | Collins et al. | |
| 10,652,455 B2 | 5/2020 | Tobin | |
| 10,939,023 B2 | 3/2021 | Scheich | |

(Continued)

FOREIGN PATENT DOCUMENTS

| | | | | |
|---|---|---|---|---|
| BR | 102018073042 A2 | * | 3/2019 | ........... G06T 1/0007 |
| CN | 110275369 A | * | 9/2019 | ............. G03B 15/06 |

(Continued)

OTHER PUBLICATIONS

360Booth—About Section on Facebook screen capture dated Apr. 2, 2021, 2 pages.

(Continued)

*Primary Examiner* — Christopher E Mahoney

(57) ABSTRACT

A revolving photography studio is disclosed. The revolving photography studio includes a stationary circular track surrounding a product setup location and an upright wall coupled to a frame defining a studio backdrop, being of a curved configuration, at least partially surrounding the product setup location, and following the stationary circular track for undergoing revolvable movement along the track using wheels. The wall comprises a defined opening for entrance into the product setup location. The revolving photography studio also includes a linear horizontal crossbar across a top of the opening and coupled to the frame. The revolving photography studio additionally comprises a plate coupled to the linear horizontal crossbar. The plate is configured to receive a camera mount.

20 Claims, 9 Drawing Sheets

(56) References Cited

U.S. PATENT DOCUMENTS

| | | |
|---|---|---|
| 10,963,749 B2 | 3/2021 | Corby, Jr. et al. |
| 2007/0057815 A1 | 3/2007 | Foy et al. |
| 2014/0152806 A1 | 6/2014 | Hauk |
| 2015/0365636 A1 | 12/2015 | King |
| 2016/0173740 A1 | 6/2016 | Corby et al. |
| 2016/0219192 A1 | 7/2016 | Rosenberry et al. |
| 2018/0160019 A1 | 6/2018 | Scheich |
| 2019/0251586 A1 | 8/2019 | Stutsman et al. |
| 2020/0045249 A1 | 2/2020 | Francois et al. |

FOREIGN PATENT DOCUMENTS

| | | |
|---|---|---|
| DE | 102005058353 B4 | 9/2009 |
| EP | 2952960 B1 | 9/2016 |
| WO | 2020172141 A1 | 8/2020 |

OTHER PUBLICATIONS

360Booth—Home _ Facebook—Photo from 360Booth's post in Mobile Uploads screen capture dated Apr. 21, 2021, 1 page.
360Booth—Home _ Facebook—Photo from 360Booth's post in Mobile Uploads screen capture dated Apr. 16, 2021, 1 page.
360Booth comp photo dated Aug. 14, 2019.
360Booth comp photo dated Sep. 18, 2018.
"Where are the motors on your studio?", 360Booth, https://360booth.com/, FAQ, dated Sep. 16, 2020, 3 pages.
Falkenberg-Hull, "Barrett-Jackson puts five iconic cars through the Carvana spinner", internet article in Automotive Map dated Aug. 25, 2020, 11 pages.
Courtney, "Living in Spin: Making Carvana's Newspinner—vol. I", internet article in Behind the Wheel dated Aug. 19, 2020, 5 pages.
Courtney, "Living in Spin: Making Carvana's New Spinner—vol. II", internet article in Behind the Wheel dated Aug. 19, 2020, 4 pages.
Courtney, "Living in Spin: Making Carvana's New Spinner—vol. III", internet article in Behind the Wheel dated Aug. 20, 2020, 3 pages.
Courtney, "Living in Spin: Making Carvana's New Spinner—vol. IV", internet article in Behind the Wheel dated Aug. 21, 2020, 4 pages.
"How tall of a vehicle can I put in my studio?", https://360booth.com/, FAQ, dated Apr. 20, 2021, 3 pages.
Turntables with fixed cameras, as well as manual 360 models from handheld phone camera and stabilizer, screen shot captured May 13, 2021, Motor Street Car Spin Studios, https://motorstreet360.com/car-studio-booths.php, 12 pages.
Ovad Photoshell, screen shot captured Jan. 26, 2021, Ovad Custom Stages website, http://ovad.com/photoshell/, 5 pages.

* cited by examiner

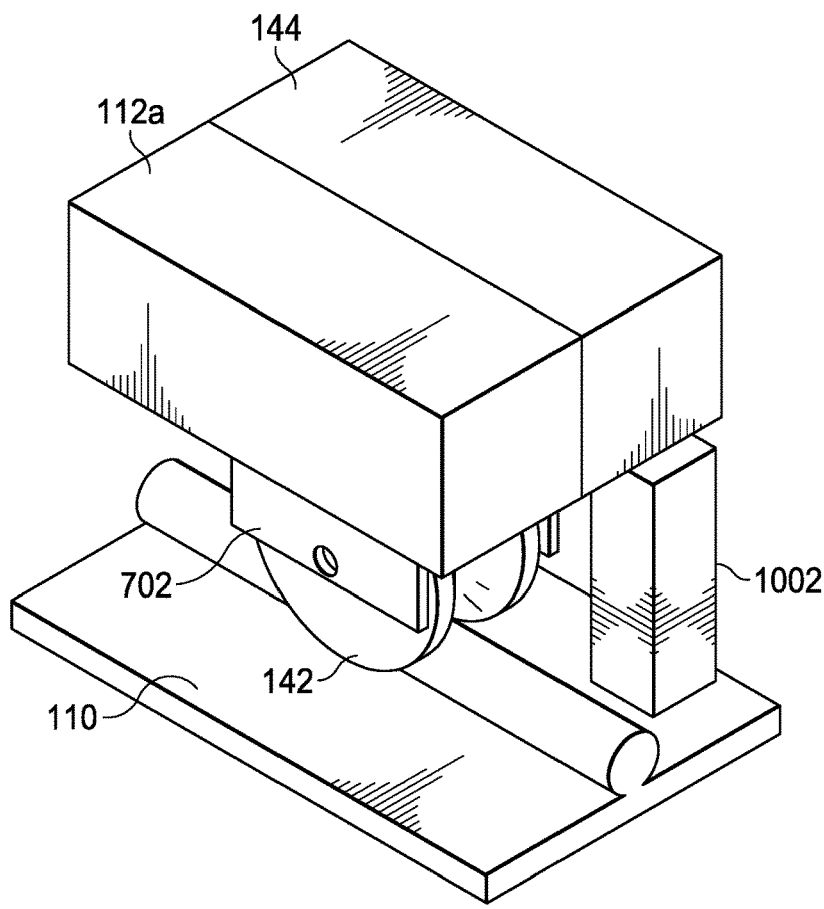
FIG. 10A
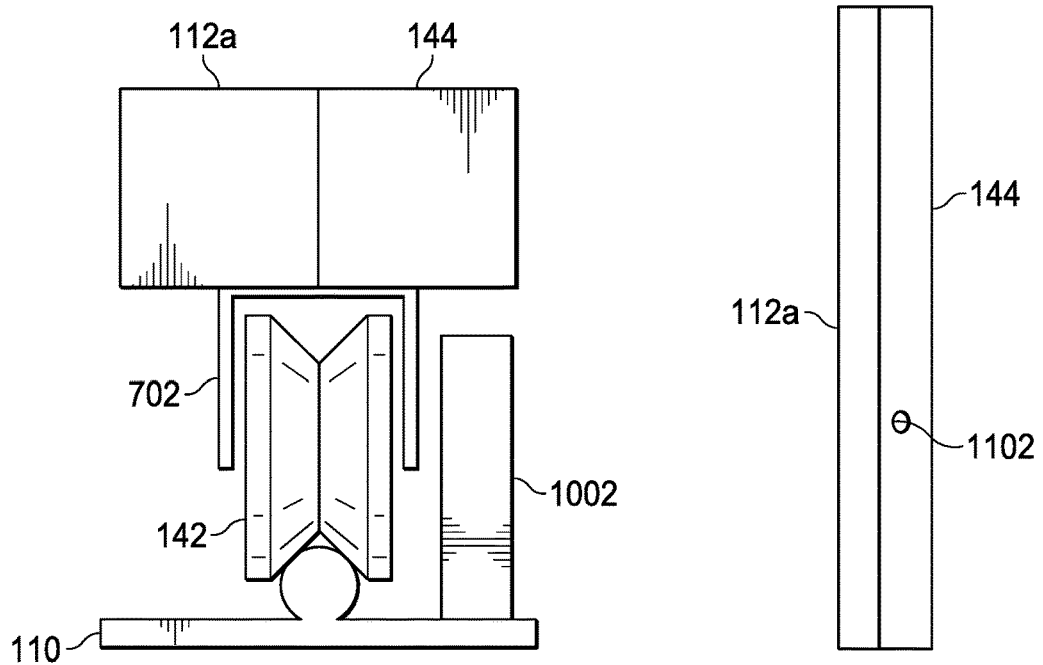
FIG. 10B
FIG. 11

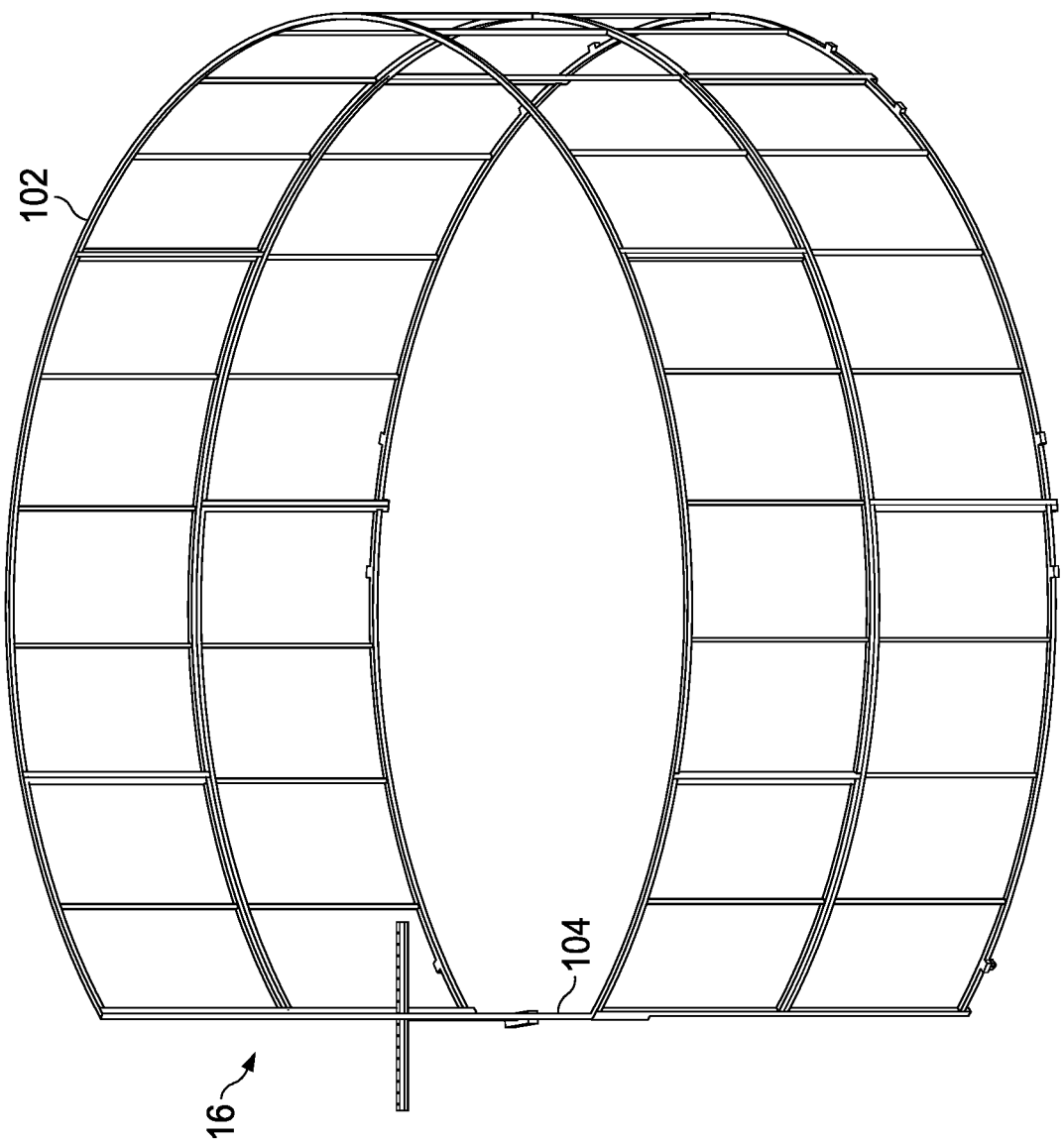
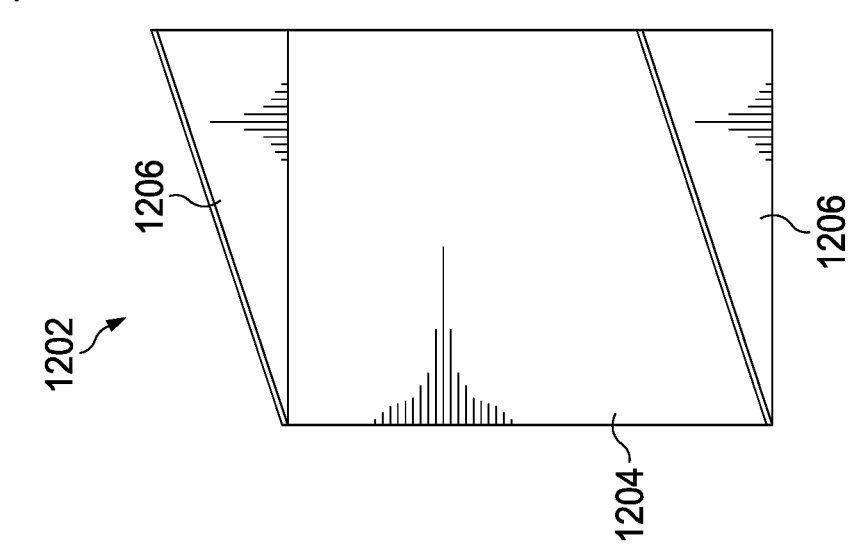
FIG. 12A

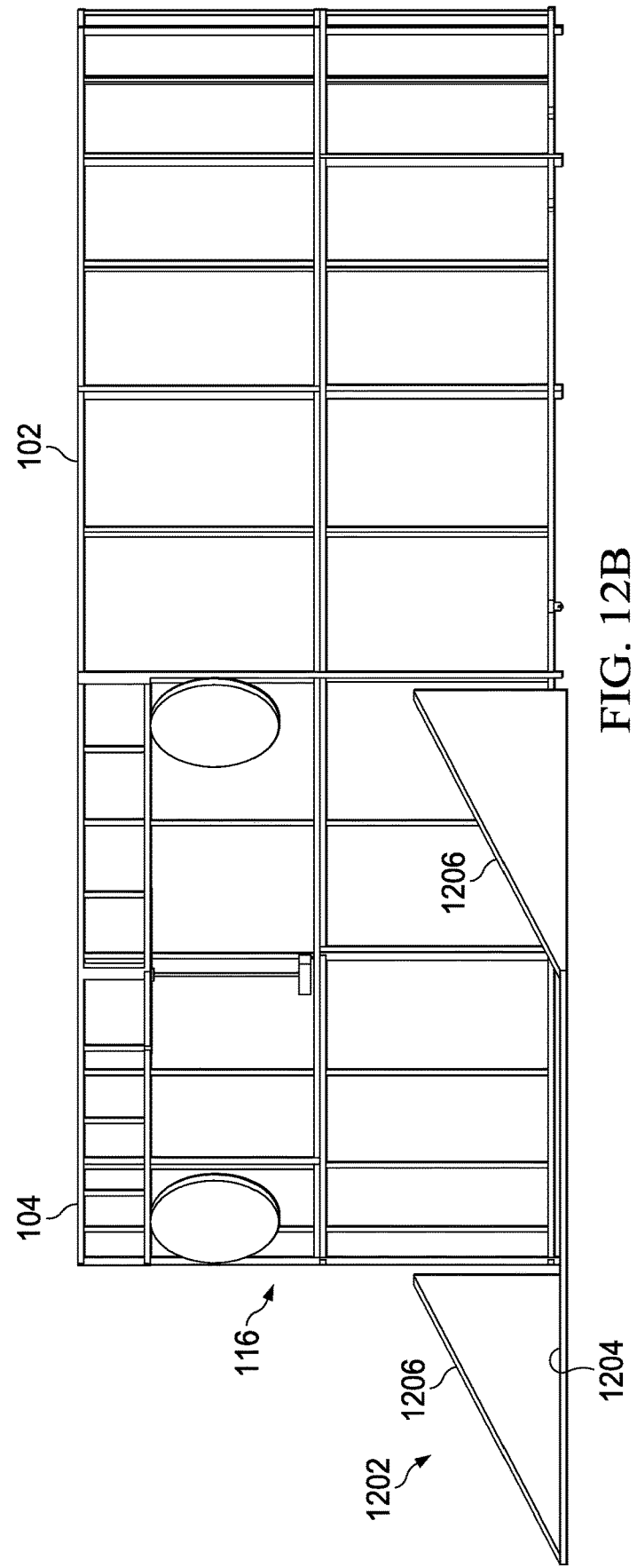

REVOLVING PHOTOGRAPHY STUDIO

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising of a consumer product, such as an automobile, typically involves many images of the consumer product from many angles, so that the customer can rely on the images to make a purchase. Motorized turntables have been used to rotate the automobile to capture images, but these motorized turntables have a number of drawbacks.

SUMMARY

In an embodiment, a revolving photography studio is disclosed. The revolving photography studio comprises a stationary circular track surrounding a product setup location. The stationary circular track comprises a plurality of magnetic indexers. The revolving photography studio also comprises an upright wall coupled to a frame defining a studio backdrop, being of a curved configuration, at least partially surrounding the product setup location, and following the stationary circular track for undergoing revolvable movement along the track using removable wheels. The wall comprises a defined opening for entrance into the product setup location. The revolving photography studio additionally comprises a horizontal crossbar across a top of the opening and coupled to the frame and a plurality of wheel mounts coupled to the frame configured to receive the removable wheels. Each of the plurality of wheel mounts comprises a magnet. The revolving photography studio further comprise at least one camera mount coupled to the horizontal crossbar. The plurality of magnetic indexers on the stationary circular track and each magnet in the plurality of wheel mounts allow the revolving photography studio to stop at predefined locations to capture photographs with at least one camera coupled to the at least one camera mount.

In another embodiment, a revolving photography studio is disclosed. The revolving photography studio comprises a stationary circular track surrounding a product setup location and an upright wall coupled to a frame defining a studio backdrop, being of a curved configuration, at least partially surrounding the product setup location, and following the stationary circular track for undergoing revolvable movement along the track using removable wheels. The wall comprises a defined opening for entrance into the product setup location. The revolving photography studio also comprises a plurality of wheel mounts coupled to the frame configured to receive the removable wheels. Each of the plurality of wheel mounts and each portion of the frame coupled to the plurality of wheel mounts comprise a plurality of slots. The plurality of slots are of a size that enable the removable wheels to be adjusted horizontally.

In yet another embodiment, a revolving photography studio is disclosed. The revolving photography studio comprises a stationary circular track surrounding a product setup location and an upright wall coupled to a frame defining a studio backdrop, being of a curved configuration, at least partially surrounding the product setup location, and following the stationary circular track for undergoing revolvable movement along the track using removable wheels. The wall comprises a defined opening for entrance into the product setup location. The revolving photography studio also comprises a linear horizontal crossbar across a top of the opening and coupled to the frame. The revolving photography studio further comprises a plate coupled to the linear horizontal crossbar. The plate is configured to receive a camera mount.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 10A is a perspective view of a wheel assembly and track with a magnetic indexer according to an embodiment of the disclosure.

FIG. 10B is a front view of a wheel assembly and track with a magnetic indexer according to an embodiment of the disclosure.

FIG. 11 is a top view of a portion of a frame and a portion of a wheel mount with a locking mechanism according to an embodiment of the disclosure.

FIG. 12A is a top, perspective view of a door for a revolving photography studio according to an embodiment of the disclosure.

FIG. 12B is a side view of a door for a revolving photography studio according to an embodiment of the disclosure.

DETAILED DESCRIPTION

Figure 1:
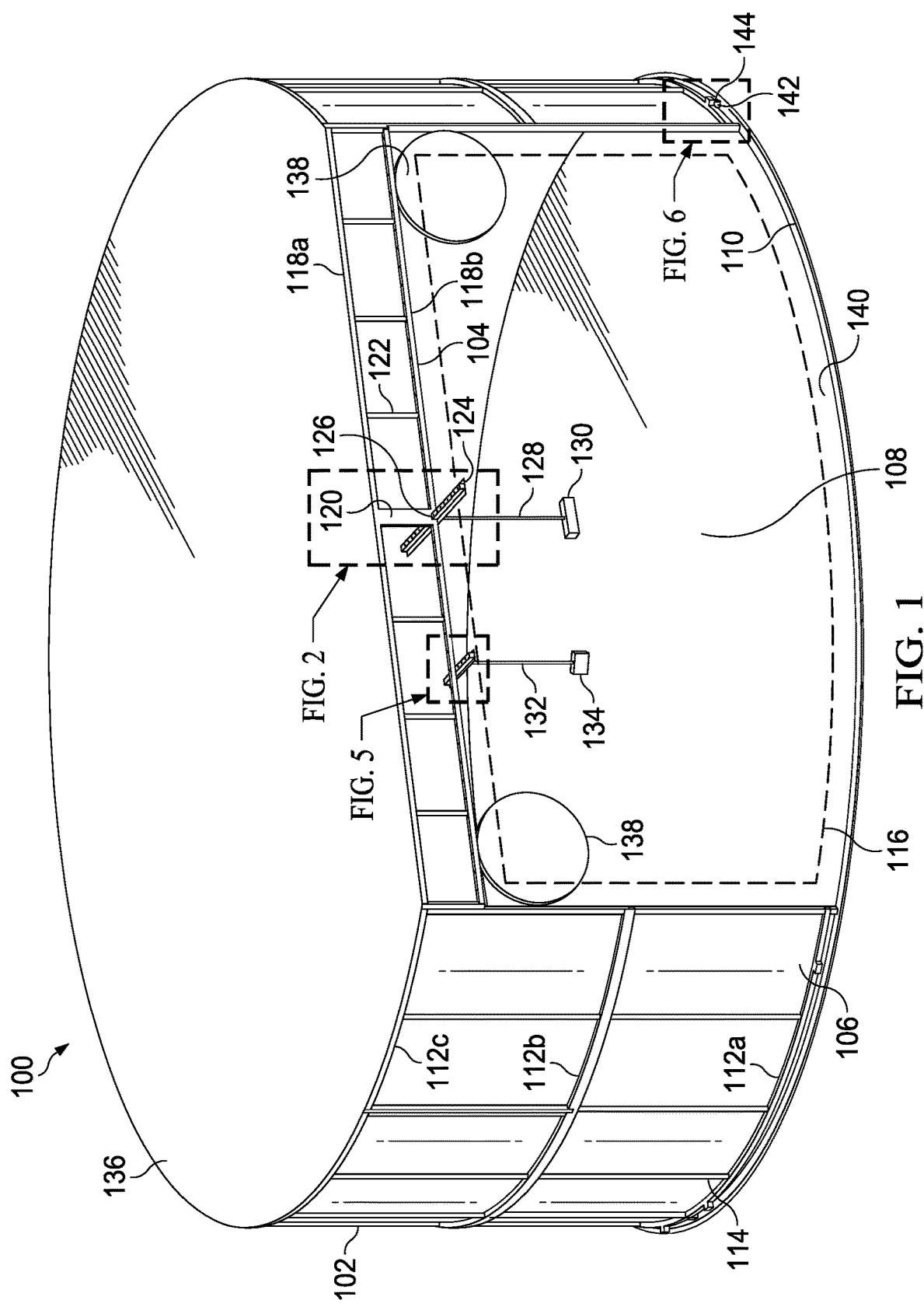
FIG. 1 is a perspective view of a revolving photography studio according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Customers often rely on images of a consumer product, such as an automobile, when making a purchase. The quality of the images is important. Backgrounds and lighting are critical to photo quality and to show details important to consumers, such as damage or features of the automobile. Poor quality images can cause a consumer to miss defects or features in the car, or not to trust the seller. Photography conditions are difficult to control with objects as large as an automobile and at as many angles as automotive photography requires. Automobiles require large studios and vary in size significantly, which requires many settings for best results. Traditional automotive photography required moving the automobile, lighting, photographer, cameras, and/or background multiple times to take pictures of a single automobile, which is inefficient, time consuming, and results in inconsistent images.

Some car dealers have used large, motorized turntables to rotate automobiles to control the photography environment. Turntables can be used to rotate an automobile around fixed backgrounds, lighting and/or cameras. While automotive turntables may provide uniform results, they include costly motors and have high installation and maintenance costs that make automotive turntables cost-prohibitive for many sellers. Further, there are risks associated with motors rotating large, expensive assets on a moving platform around studio equipment and photographers or other employees or customers.

Thus, the pending application is directed to a revolving photography studio, which can be manually operated to rotate around an automobile. The revolving photography studio includes a rotating studio background as well as rotating camera mounts and lighting around a stationary track, to provide a controlled, studio quality photo result from multiple angles. The revolving photography studio disclosed herein allows the innovative, uniform photo results achieved with turntables without the cost of motorized turntables and with simpler installation than motorized turntables.

The revolving photography studio may include a robust, horizontal crossbar across a top of the opening to the revolving photography studio. The opening allows automobiles to enter and exit the revolving photography studio. The horizontal crossbar may be a linear horizontal crossbar, which is less costly to manufacture and install than a curved front piece, provides additional structural stability, and acts as a jig to ensure the correct geometric measurements at installation. The linear horizontal crossbar also allows for higher clearance of tall automobiles, such as automobiles over nine feet tall. The higher clearance that results from use of the linear horizontal crossbar may be in part because the linear horizontal crossbar is offset from the track. For example, in an embodiment where the track is above ground level, because the linear horizontal crossbar is offset from the track, the wheels of the automobile are not simultaneously driving over the track, which raises the automobile, and under the horizontal crossbar at the same time.

The horizontal crossbar may include a top bar, a bottom bar, and a vertical spacer bar between the top bar and the bottom bar. The vertical spacer bar may comprise a plurality of bars coupled together, and plate configured to receive a camera mount may be coupled to the vertical spacer bar. In some embodiments, the vertical spacer bar may include a cutout, and at least a portion of the plate configured to receive the camera mount may be inserted through the cutout. The positioning of the plate on the vertical spacer bar may be adjustable. One or more camera mounts may also be coupled to different places on the horizontal crossbar. For example, the bottom bar may comprise a plurality of bolt holes at a plurality of different locations, which allows a camera mount to be attached at any of the plurality of locations along the bottom bar. Alternatively, the bottom bar and/or plate and the camera mount may magnetically couple together.

As discussed above, the revolving photography studio may include one or more customizable mounts for camera location, which enables control over photo quality and provides uniform results, while allowing flexibility for various types of cars or photography related applications. In particular, one or more camera mounts may be coupled to the revolving photography studio, such as on the horizontal crossbar, to eliminate the guesswork of vertical and horizontal alignment, providing more uniform results in the height and distance of the camera. The camera mounts may be adjustable vertically and/or horizontally to allow flexibility for the size of automobile being photographed or the photography results sought. The camera mounts may be adjusted manually or automatically (e.g., by remote control). The camera mounts coupled to the revolving photography studio enable remote control of camera(s) to allow the photos to be taken quickly without the photographer needing to walk around the background. Use of camera mounts also allows installation in a smaller space, as the clearance for cameras can be smaller than the clearance needed for both a photographer or tripod and a camera. Having multiple mounts coupled to the revolving photography studio allows for multiple camera angles or a combination of different types of cameras, such as still and video or panoramic at the same time. The camera mounts can be combined with existing technology to create animations, 3D models, videos, or other photo-related results.

The revolving photography studio may also include removable wheels, thereby eliminating the cost and weaknesses of the previous welded wheel approach. Removable wheels allow easy removal, replacement, and/or relocation of the wheels. Removable wheels make repairs, maintenance, transport, and installation easier, and make precise fitting to the track more accurate. The removable wheels may be mounted on the interior, exterior, or bottom of the frame of the revolving photography studio, thereby allowing flexible installation. In an example, a wheel may be coupled to a wheel bracket, and the wheel bracket may be coupled to a bottom of the frame as well as coupled to a wheel mount, which is coupled to the frame. The wheel mounts and removable wheels allow customizable wheels as well as wheel placement. For example, the portion of the frame that the wheel bracket attaches to and the wheel mount may allow the removable wheels to be adjusted horizontally.

Additionally, where the removable wheels couple to the frame of the revolving photography studio via the wheel mounts may be customizable based on customer need. Further, the size of the removable wheels and/or wheel mounts and frame may be customizable based on customer need to raise the height of the revolving photography studio. The wheel mounts and removable wheels enable flexible installation, such as an installation closer to a wall that would not be possible without an outside mount of the wheel, or an installation that avoids a hazard on the floor by allowing a larger or smaller track for the same frame, or a taller installation with taller wheels or larger wheel mounts, or with wheels mounted underneath the frame. The revolving photography studio disclosed herein cuts manufacture, installation, and repair costs of the rotating background by installing a multifunction horizontal crossbar and removable wheels.

The removable wheels and wheel mounts also allow installation that minimizes or eliminates the gap between the upright wall coupled to the frame of revolving photography studio and the floor such that the wheels and track are not visible in photos. For example, an outside mount of the wheels enables the upright wall to be placed on the frame such that it extends past the bottom horizontal bar of the frame. The combination of the flexible placement of the wheels and having the upright wall extend past the bottom horizontal bar of the frame minimizes the gap between the upright wall and the floor such that the wheels and the track are not visible in the photos. Minimization of that gap results in a cleaner, more professional studio result, which is important for applications like chroma key photography, commonly known as green screen.

In some embodiments, the wheel mounts may include magnets. In such embodiments, the track includes a plurality of magnetic indexers at predefined locations. The plurality of magnetic indexers on the track and the magnets in the wheel mounts allow the revolving photography studio to stop at the predefined locations to capture photographs with a camera coupled to a camera mount. This allows quick manual operation with consistent photography angles without visual references. In some cases, the adjusting of the camera mount may be remotely controlled. If the camera mount is remotely controlled, the adjusting of the camera mount and consequently the camera may be synchronized according to the particular location the revolving photography studio is stopped at due to the magnet indexers, thereby enabling optimal photos of the automobile.

The revolving photography studio may comprise a door. The door may help secure the revolving photography studio especially if installed in an outdoor location. The revolving photography studio may additionally comprise a ceiling. The ceiling may help filter ambient lighting to enable consistent lighting at different angles and create a studio atmosphere. In some cases, the revolving photography studio may comprise battery powered lighting. Battery powered lighting enables cheaper installation and more flexibility with respect to install locations as power is not needed for the lights to work. The revolving photography studio disclosed herein may comprise a ramp that covers the track at the opening to protect the track from the weight of the automobile. The revolving photography studio may comprise a lock that prevents the background from rotating. This lock would prevent unauthorized use and enables the revolving studio to be fixed to align with security cameras. The revolving photography studio disclosed herein may comprise a laser or some other visual cue to act as a visual aid to show the automobile where to position itself within the revolving photography booth for optimal pictures. In some cases, the frame of the revolving photography studio may lock to the track. This prevents the booth from getting knocked off the track by weather conditions.

Turning now to FIG. 1, an embodiment of a revolving photography studio 100 is illustrated. The revolving photography studio 100 may include a frame 102, a horizontal crossbar 104, an upright wall 106, a product setup location 108, and a track 110. The frame 102 may be made out of any rigid material. For example, the frame 102 may be made out of metal. In an embodiment, the frame 102 is made out of steel. In some embodiments, the frame 102 may be made out of a different material than metal without departing from the spirit or scope of the disclosure. In an embodiment, the frame 102 is in a curved configuration and surrounds the product setup location 108. The frame 102 may comprise a plurality of horizontal bars 112 in a curved configuration including a bottom horizontal bar 112a, a middle horizontal bar 112b, and a top horizontal bar 112c. The frame 102 may also comprise a plurality of vertical bars 114. In an embodiment, the frame 102 partially surrounds the product setup location 108. For example, the frame 102 may comprises an opening 116 for entrance into and exit from the product setup location 108. The opening 116 may allow automobiles to enter and exit the revolving photography studio 100.

The horizontal crossbar 104 may be coupled to the frame 102 and located across a top of the opening 116 into the product setup location 108. In an embodiment, the horizontal crossbar 104 is a linear horizontal crossbar, which is less costly to manufacture and install than a curved front piece, provides additional structural stability, and acts as a jig to ensure the correct geometric measurements at installation. The horizontal crossbar 104 also allows for higher clearance of tall automobiles, such as automobiles over nine feet tall. The higher clearance that results from use of the horizontal crossbar 104 may be in part due to the height of the horizontal crossbar 104. For example, the height of the horizontal crossbar 104 may be 16 to 20 inches. In one embodiment, the horizontal crossbar 104 may be approximately 18 inches in height. Additionally, or alternatively, the higher clearance that results from use of the horizontal crossbar 104 may be in part because the horizontal crossbar 104 is offset from the track 110. For example, in an embodiment where the track 110 is above ground level, because the horizontal crossbar 104 is offset from the track 110, the wheels of the automobile are not simultaneously driving over the track 110, which raises the automobile, and under the horizontal crossbar 104 at the same time. The length of the horizontal crossbar 104 may vary depending on the size of the frame 102 and the revolving photography studio 100. In an embodiment, the length of the horizontal crossbar 104 is between 200 and 250 inches. In other embodiments, the length of the horizontal crossbar 104 may be less than 200 inches or more than 250 inches. In one embodiment, the horizontal crossbar 104 may be approximately 223.5 inches long, which would fit an 8.5 foot high vehicle. While the horizontal crossbar 104 is described above as being linear, in an alternative embodiment, the horizontal crossbar 104 may be angled or curved.

The horizontal crossbar 104 may be made out of the same material as the frame 102. For example, the horizontal crossbar 104 may be made out of metal. In an embodiment, the horizontal crossbar 104 is made out of steel. The horizontal crossbar 104 may be a simple horizontal crossbar comprising a single bar. In other embodiments, the horizontal crossbar 104 may be a more complex horizontal crossbar. For example, the horizontal crossbar 104 may comprise a plurality of horizontal bars 118 including a top bar 118*a* and a bottom bar 118*b*. The horizontal crossbar 104 may also comprise a vertical spacer bar 120 and a plurality of other vertical bars 122. The vertical bars 122 and the vertical spacer bar 120 may each be spaced apart at 20 to 35 inches. In an embodiment, The vertical bars 122 and the vertical spacer bar 120 may each be spaced at 27 inches from each other.

Figure 2:
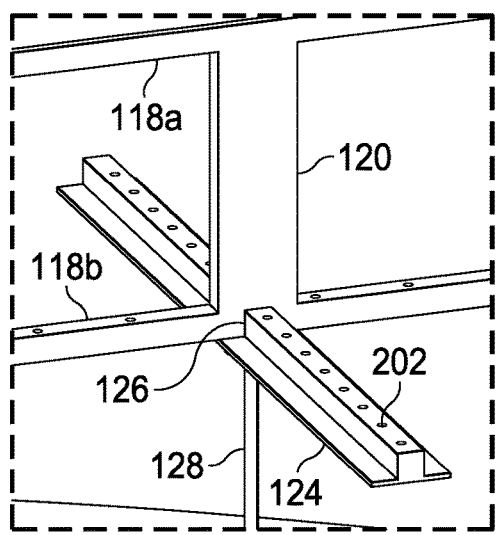
FIG. 2 is a perspective view of a portion of a horizontal crossbar according to an embodiment of the disclosure.
Figure 3:
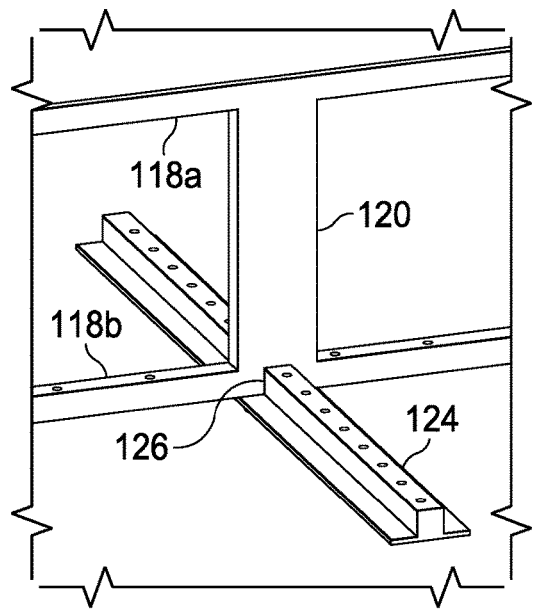
FIG. 3 is a perspective view of a portion of a horizontal crossbar according to an embodiment of the disclosure.

In an embodiment, the vertical spacer bar 120 is wider than the other vertical bars 122. For example, the vertical spacer bar 120 may be at least two times wider than the other vertical bars 122, at least three times wider than the other vertical bars 122, at least four times wider than the other vertical bars 122, or at least five times wider than the other vertical bars 122. The vertical spacer bar 120 may be 2 to 6 inches wide while the other vertical spacer bars 122 may be 0.5 to 1.5 inches wide. In one embodiment, the vertical spacer bar 120 is about 4.5 inches wide while the other vertical spacer bars 122 are 1 or 1.5 inches wide. In some embodiments, as illustrated in FIGS. 1, 2, and 3, the vertical spacer bar 120 may be a single bar. In alternative embodiments, the vertical spacer bar 120 may comprise a plurality of bars. The vertical spacer bar 120 may be wider to accommodate the insertion of at least a portion of the plate 124 through a cutout 126 in the vertical spacer bar 120. The vertical spacer bar 120 and the other vertical spacer bars 122 may be square bars or some other shape bar.

At least a portion of the plate 124 may be inserted through the cutout 126 and coupled to the horizontal crossbar 104. The plate 124 may be coupled to the horizontal crossbar 104 via one or more bolts or some other coupling through one or more of the plurality of bolt holes 202. The plate 124 may be 40 to 56 inches in length and 1 to 5 inches in width. In an embodiment, the plate 124 is approximately 48 inches in length and 3 inches in width. The plate 124 may be tiered with a center portion of the plate 124 having more height than the outer portions of the plate 124, and the center portion of the plate 124 may be the portion of the plate 124 within the cutout 126. The plate 124 may be configured to receive a first camera mount 128, and a first camera 130 may be coupled to the first camera mount 128. The positioning of the plate 124 within the cutout 126 may be adjustable (e.g., slidable) via the plurality of bolt holes 202 such that the position of the first camera mount 124 can be moved further into the product setup location 108 and closer to an automobile or further outside the opening 116 and further from an automobile.

In an embodiment, illustrated in FIG. 2, the plate 124 may comprise a plurality of bolt holes 202. The first camera mount 128 may be coupled to the plate via one of the plurality of bolt holes 202 (e.g., using bolts, screws, and/or other hardware). Alternatively, the plate 124 and the first camera mount 128 may be magnetic, and the plate 124 and the first camera mount 128 may be magnetically coupled together. In another embodiment, illustrated in FIG. 3, the plate 124 does not comprise a plurality of bolt holes. In such an embodiment, the plate 124 and the first camera mount 128 are magnetic, and the plate 124 and the first camera mount 128 are magnetically coupled together.

Figure 4:
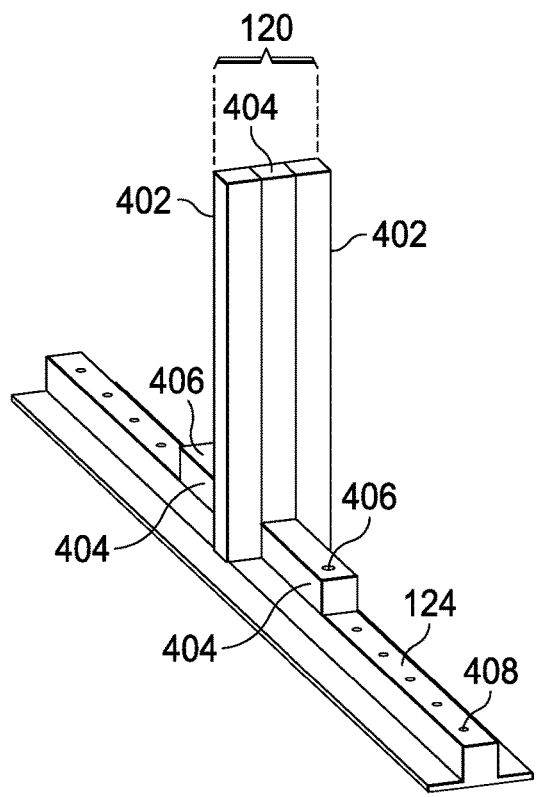
FIG. 4 is a perspective view of a portion of a horizontal crossbar according to an embodiment of the disclosure.

While the vertical spacer bar 120 is illustrated in FIGS. 1, 2, and 3 as being a single bar, as illustrated in FIG. 4, in some embodiments, the vertical spacer bar 120 may comprise a plurality of bars. For example, the vertical spacer bar 120 may comprise two vertical bars 402 and a T-shaped bar 404 between the two vertical bars 402. The T-shaped bar 404 may comprise a plurality of bars (e.g., a vertical bar and a horizontal bar) welded together to form one solid piece. The T-shaped bar 404 may comprise two thru holes (not illustrated) to couple the vertical bars 402 with bolts or some other coupling. The plate 124 may be mounted below the crossbar 104 to the vertical spacer bar 120 via the T-shaped bar 404. The bolt holes 406 of the T-shaped bar 404 may align with the bolt holes 408 of the plate 124. The plate 124 may couple to the vertical spacer bar 120 via the bolt holes 406 in the T-shaped bar 404 and the bolt holes 408 in the plate 124 using one or more bolts or some other coupling. The plurality of bolt holes 408 in the plate 124 enable adjustment of the position of the first camera mount 124 further into the product setup location 108 and closer to an automobile or further outside the opening 116 and further from an automobile. In the embodiment illustrated in FIG. 4, the plate 124 may hang down below the horizontal crossbar 104.

Figure 5:
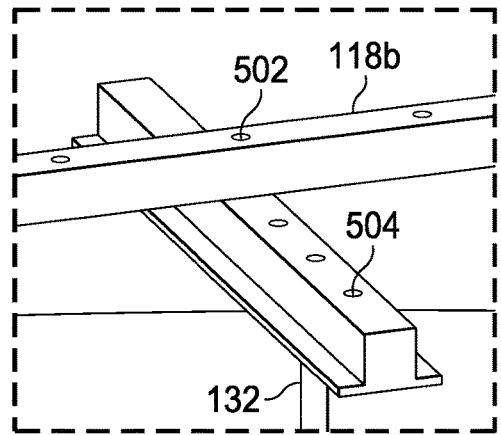
FIG. 5 is a perspective view of a portion of a horizontal crossbar according to an embodiment of the disclosure.
Figure 6:
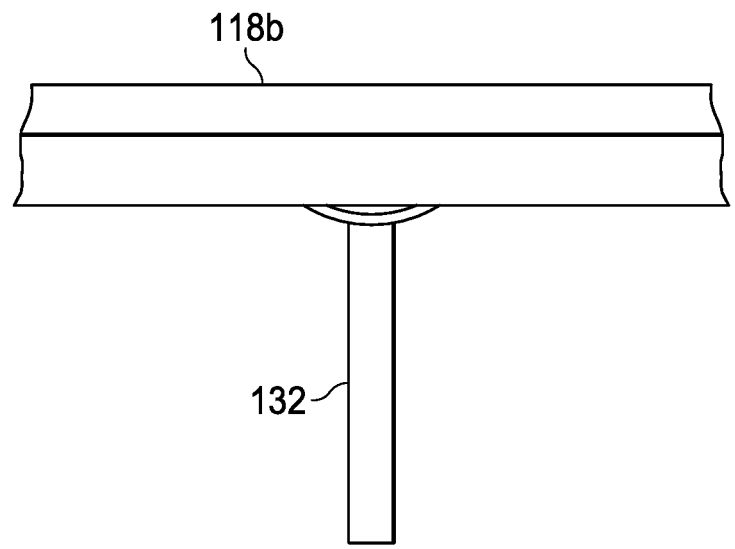
FIG. 6 is a perspective view of a portion of a horizontal crossbar according to an embodiment of the disclosure.

One or more camera mounts may be coupled to different places on the horizontal crossbar 104 other than the plate 124. For example, a second camera mount 132 may be coupled to the horizontal crossbar 104, and a second camera 134 may be coupled to the second camera mount 132. As illustrated in FIG. 5, in an embodiment, the bottom bar 118*b* of the horizontal crossbar 104 comprises a plurality of bolt holes 502 at a plurality of different locations. In such an embodiment, the second camera mount 132 may also comprise a plurality of bolt holes 504, which can be aligned with at least one of the plurality of bolt holes 502 of the bottom bar 118*b* to secure the second camera mount 132 to the horizontal crossbar 104 using bolts, screws, and/or other hardware. The plurality of bolt holes 504 on the second camera mount 132 allows the second camera mount 132 to be adjustable such that the second camera mount 132 can be moved further into the product setup location 108 or further outside the opening 116. In some embodiments, as illustrated in FIG. 6, rather than couple to the bottom bar 118*b* of the horizontal crossbar 104 via a plurality of bolt holes, the bottom bar 118*b* of the horizontal crossbar 104 and the second camera mount 132 may be magnetic, and the second camera mount 132 may magnetically couple to the bottom bar 118*b* of the horizontal crossbar 104. In such embodiments, the horizontal crossbar 104 may not comprise bolt holes.

While two camera mounts are illustrated in FIG. 1, there may be more or less camera mounts coupled to the horizontal crossbar 104 without departing from the spirit or scope of the present disclosure. As discussed above, the first camera mount 128 and/or the second camera mount 132 may be customizable mounts for camera location, which enables control over photo quality and provides uniform results, while allowing flexibility for various types of cars or photography related applications. Coupling the first camera mount 128 and/or the second camera mount 132 to the horizontal crossbar 104 helps eliminate the guesswork of vertical and horizontal alignment, thereby providing more uniform results in the height and distance of the cameras (e.g., the first camera 130 and/or the second camera 134). The first camera mount 128 and/or the second camera mount 132 may be adjustable vertically and/or horizontally to allow flexibility for the size of automobile being photographed or the photography results sought. The first camera mount 128 and/or the second camera mount 132 may be adjusted manually or automatically (e.g., by remote control). The automatic adjustment of the first camera mount 128 and/or the second camera mount 132 may be enabled mechanically such as through use of gears that shift to move the first camera mount 128 and/or the second camera mount 132 up, down, left, right, swivel, angle, or another type of movement.

The first camera mount 128 and/or the second camera mount 132 coupled to the revolving photography studio 100 enable remote control of camera(s) (e.g., the first camera mount 128 and/or the second camera mount 132) to allow the photos to be taken quickly without the photographer needing to walk around the background. Use of the first camera mount 128 and/or the second camera mount 132 also allows installation in a smaller space, as the clearance for cameras can be smaller than the clearance needed for both a photographer or tripod and a camera. Having multiple camera mounts such as the first camera mount 128 and the second camera mount 132 coupled to the revolving photography studio 100 allows for multiple camera angles or a combination of different types of cameras, such as still and video or panoramic at the same time.

The upright wall 106 may be coupled to the frame 102. In an embodiment, the upright wall 106 is of a curved configuration like the frame 102 to which it is coupled. The upright wall 106 may be flat initially and curved upon installation or curved initially. The upright wall 106 may at least partially surround the product setup location 108 by excluding the opening 116. The upright wall 106 may comprise a single panel or a plurality of panels. In some embodiments, the plurality of panels that make up the upright wall 106 may be removable from the frame 102. In an embodiment, the upright wall 106 is made from plastic, such as 3M sintra or another type of plastic. In alternative embodiments, the upright wall 106 may be made of other rigid material such as wood, metal, cardboard, or another material. The upright wall 106 may be coupled to the frame 102 via hardware or adhesive. The upright wall 106 may vary in color depending on customer preference. In an embodiment, the upright wall 106 maybe be green or any color to allow for chroma keying.

In some embodiments, the revolving photography studio 100 may comprise a roof 136. The interior surface of the roof 136 creates a ceiling for the revolving photography studio 100. Having a roof 136 that creates a ceiling for the revolving photography studio 100 improves lighting conditions and blocks exterior elements in photos (e.g., ceilings of the place where the revolving photography studio 100 is located, trees or outside elements if the revolving photography studio 100 is located outside, etc.). The roof 136 may be secured to the top horizontal bar 112c of the frame 102. For example, the roof 136 may be coupled to the top horizontal bar 112c of the frame 102 via tiedowns. The roof 136 may be made of fabric or another stretchable material. If the revolving photography studio 100 is located outside, the roof 136 may be made of waterproof material. In some embodiments, the roof 136 is made to be opaque for lighting needs.

The revolving photography studio 100 may comprise one or more lights 138. The light(s) 138 may be coupled to the revolving photography studio 100. For example, the light(s) 138 may be coupled to the horizontal crossbar 104. In some embodiments, the light(s) 138 may be coupled to the horizontal crossbar 104 via one or more of the plurality of bolt holes 502 on the horizontal cross bar 104. Alternatively, the light(s) 138 may magnetically couple to the horizontal crossbar 104. The light(s) 138 may be battery powered or plugged into a power source. Battery powered lights would be particularly useful if the revolving photography studio 100 was located in a place without a power source or in a place where power is problematic or limited. Battery powered lights may also allow for cheaper installation. The light(s) 138 may be white lights or color changing lights.

The revolving photography studio 100 may comprise a floor 140. In an embodiment, the floor 140 of the revolving photography studio 100 is an existing floor of the location where the revolving photography studio 100 is installed. In another embodiment, the floor 140 of the revolving photography studio may be a floor specifically designed and installed as part of the revolving photography studio 100. In such an embodiment, the floor 140 may be made of tile, carpet, rubber mat, garage tiles, epoxy, or another material.

Figure 9A:
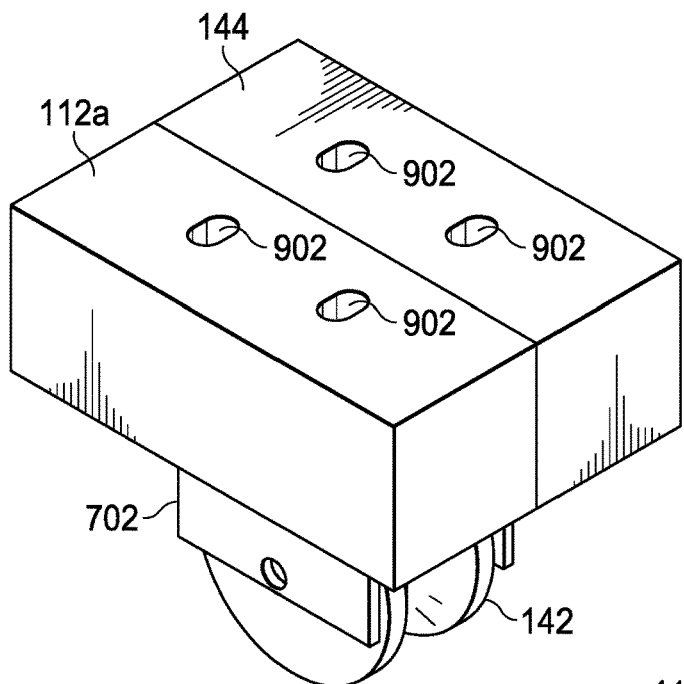
FIG. 9A is a perspective view of a wheel assembly according to an embodiment of the disclosure.
Figure 9B:
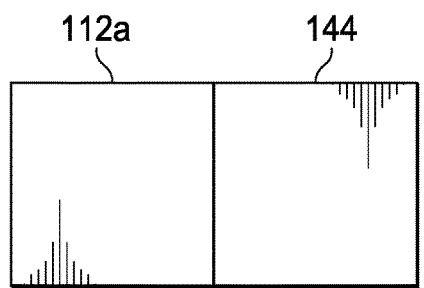
FIG. 9B is a front view of a wheel assembly according to an embodiment of the disclosure.

The track 110 may be a stationary circular track that surrounds the product setup location 108. The track 110 may be sit on the ground be above ground level (as seen in FIGS. 1, 9A, and 9B). Alternatively, the track 110 may be sunken such that the track 110 is below ground level. Other track configurations are possible without departing from the spirit and scope of the present disclosure.

The frame 102, horizontal crossbar 104, and upright wall 106 may follow the track 110 and undergo revolvable movement along the track 110. The revolvable movement may be by manual operation. For example, one or more persons may rotate the frame 102, horizontal crossbar 104, and upright wall 106 around the track 110. Alternatively, the revolvable movement may be automatic such as via a motor. In either case, the movement of the frame 102, horizontal crossbar 104, and upright wall 106 along the track 110 is via a plurality of wheels 142 coupled to the bottom horizontal bar 112a and a plurality of wheel mounts 144. The plurality of wheels 142 may be removable wheels. Removable wheels allow easy removal, replacement, and/or relocation of the wheels. Additionally, removable wheels make repairs, maintenance, transport, and installation easier, and make precise fitting to the track 110 more accurate. The plurality of wheels 142 may be mounted on the interior, exterior, or bottom of the frame 102 of the revolving photography studio 100, thereby allowing flexible installation. In some cases herein, the plurality of wheels 142 may be referred to as the removable wheels 142.

Figure 7:
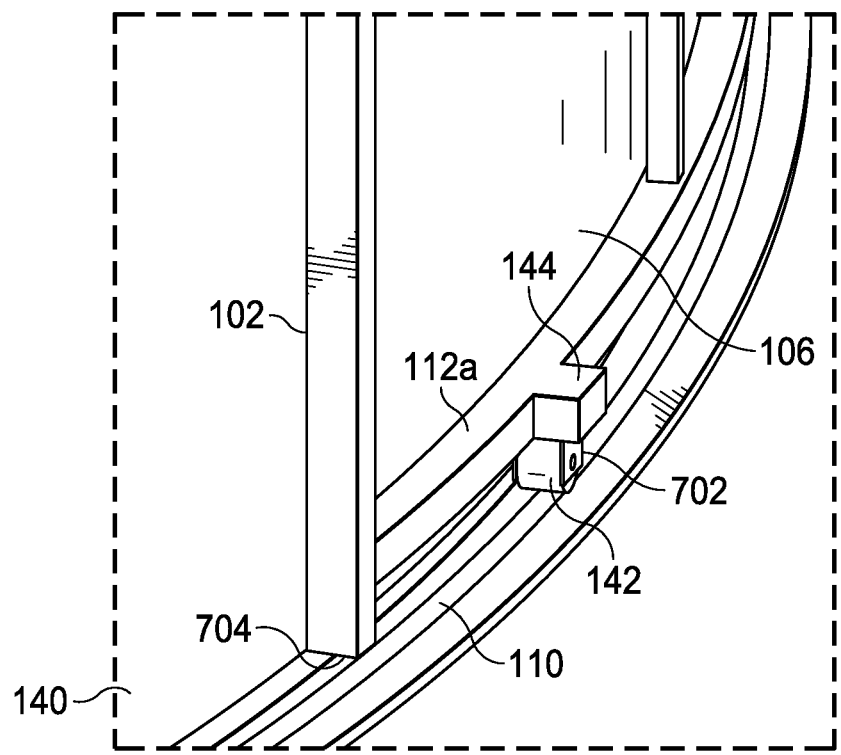
FIG. 7 is a perspective view of a portion of a revolving photography studio according to an embodiment of the disclosure.
Figure 8A:
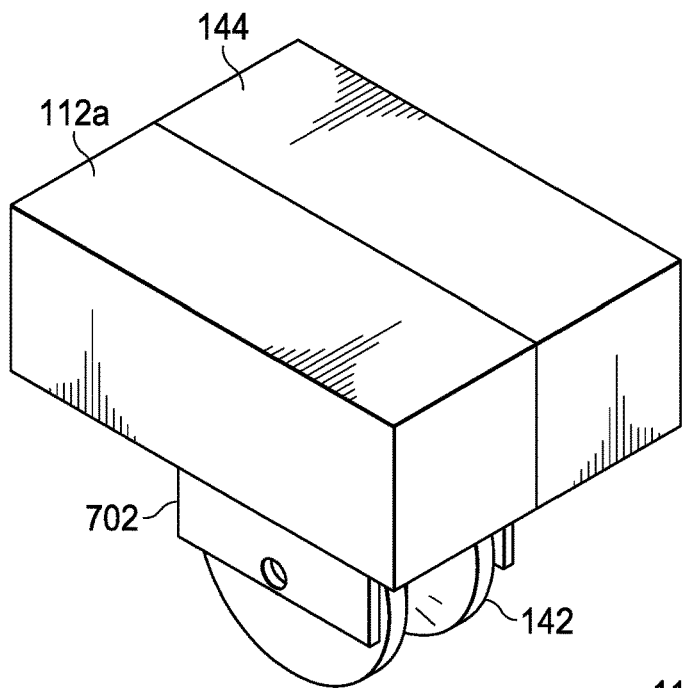
FIG. 8A is a perspective view of a wheel assembly according to an embodiment of the disclosure.
Figure 8B:
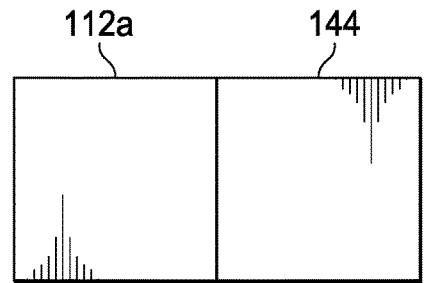
FIG. 8B is a front view of a wheel assembly according to an embodiment of the disclosure.
Figure 8C:
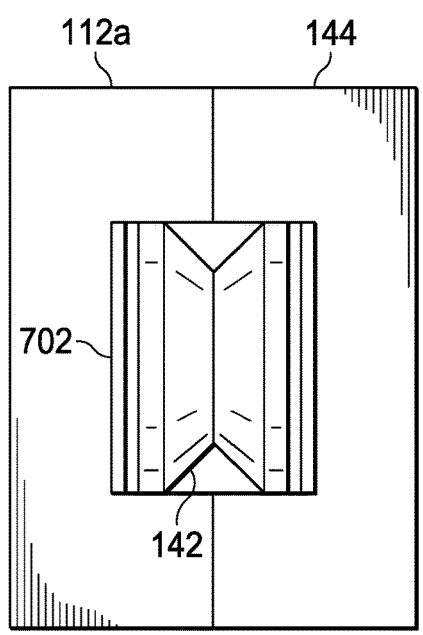
FIG. 8C is a bottom view of a wheel assembly according to an embodiment of the disclosure.

Turning to FIG. 7, the plurality of wheel mounts 144 may be coupled to the bottom horizontal bar 112a of the frame 102. Where the removable wheels 142 couple to the frame 102 of the revolving photography studio 100 via the wheel mounts 144 may be customizable based on customer need. The plurality of wheel mounts 144 may be coupled to the outside of the bottom horizontal bar 112a of the frame 102. Referring to FIGS. 8A-8C, the removable wheel 142 may be coupled to a wheel bracket 702, and the wheel bracket 702 may be coupled to a bottom of the bottom horizontal bar 112a of the frame 102 as well as coupled to a bottom of the wheel mount 144.

Figure 9C:
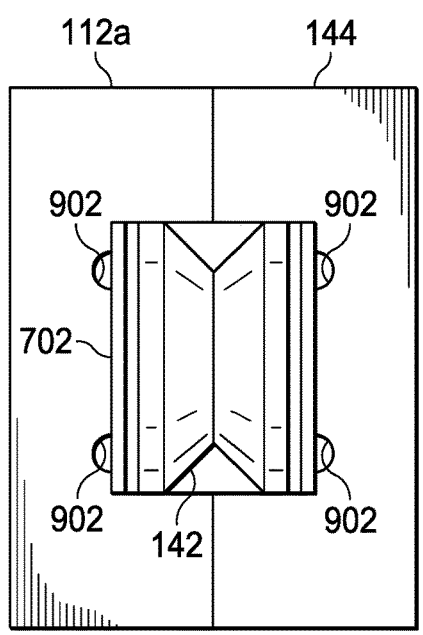
FIG. 9C is a bottom view of a wheel assembly according to an embodiment of the disclosure.

The wheel mounts 144 and removable wheels 142 allow customizable wheels as well as wheel placement. For example, in an embodiment as illustrated in FIGS. 9A-9C, the portion of the frame 102 that the wheel bracket 702 attaches to and the wheel mount 144 may allow the removable wheels 142 to be adjusted horizontally. This horizontal adjustment may be enabled via a plurality of slots 902 through which the removable wheel 142 couples to the frame 102 and wheel mount 144 via the wheel bracket 702. The plurality of slots 902 may be oversized such that the wheel bracket 702 can be adjusted horizontally and then secured to the frame 102 and the wheel bracket 702 such as by bolts. Although not illustrated in FIGS. 9A-9C, the wheel bracket 702 may comprise a plurality of holes to enable mounting to the frame 102 and the wheel mount 144 via the slots 902. While four slots 902 are illustrated in FIGS.

9A-9C, fewer slots or more slots could be present without departing from the spirit or scope of the present disclosure.

The size of the removable wheels 142 and/or wheel mounts 144 and frame 102 may be customizable based on customer need to raise the height of the revolving photography studio 100. Alternatively or additionally, the height of the revolving photography studio 100 may be adjusted with longer bolts and/or use of spacers and/or washers to lift the frame 102 off of the removable wheels 142. This vertical adjustability allows installation of the revolving photography studio 100 to the specific height requirements of the installation.

The removable wheels 142 and wheel mounts 144 also allow installation that minimizes or eliminates the gap between the upright wall 106 coupled to the frame 102 of revolving photography studio 100 and the floor 140 such that the removable wheels 142 and track 110 are not visible in photos. For example, an outside mount of the removable wheels 142 enables the upright wall 106 to be placed on the frame 102 such that it extends past the bottom horizontal bar 112a of the frame 102. This overhang 704 of the upright wall 106 can be seen in FIG. 7. Minimization of the gap between the upright wall 106 and the floor 140 results in a cleaner, more professional studio result, which is important for applications like chroma key photography, commonly known as green screen.

Turning now to FIGS. 10A and 10B, in some embodiments, the wheel mounts 144 include magnets. In such embodiments, the track 110 includes a plurality of magnetic indexers 1002 at predefined locations. The plurality of magnetic indexers 1002 on the track 110 and the magnets in the wheel mounts 144 allow the revolving photography studio 100 to stop at the predefined locations to capture photographs with a camera coupled to a camera mount (e.g., the first camera 130 on the first camera mount 128 and/or the second camera 134 on the second camera mount 132). This allows quick manual operation with consistent photography angles without visual references. As discussed above, in some cases, the adjusting of the first camera mount 128 and/or the second camera mount 132 may be remotely controlled. If the first camera mount 128 and/or the second camera mount 132 is remotely controlled, the adjusting of the first camera mount 128 and/or the second camera mount 132 and consequently the first camera 130 and/or the second camera 134 may be synchronized according to the particular location the revolving photography studio 100 is stopped at due to the magnet indexers 1002, thereby enabling optimal photos of the automobile. For example, at particular locations, the first camera mount 128 and/or the second camera mount 132 may be adjusted (e.g., moved up, down, left, right, angled, swiveled, etc.) based on the particular location the revolving photography studio 100 is stopped at due to the magnetic indexers 1002.

Turning now to FIG. 11, the revolving photography studio 100 may comprise a locking mechanism. In FIG. 11, the bottom horizontal bar 112a of the frame 102 and the wheel mount 144 are illustrated along with a locking pin hole 1102. In FIG. 10, the locking pin hole 1102 is in the wheel mount 144. However, the locking pin hole 1102 may be placed in a different location (e.g., in the bottom horizontal bar 112a of the frame 102). Insertion of a pin (not illustrated) through the lock pin hole 1102 and into a corresponding hole in the track 110 (not illustrated) locks the revolving photography studio 100 to the track 110 and prevents the revolving photography studio 100 from rotating. The lock may prevent unauthorized use and allow the revolving photography studio 100 to be fixed to in a particular direction such as for example to align with security cameras.

Turning now to FIGS. 12A and 12B, the revolving photography studio 100 may comprise a door 1202. The door 1202 may be used to cover the opening 116. In an embodiment, the door 1202 comprises a front panel 1204 and two side panels 1206. The front panel 1204 may be rectangular in shape. The side panels 1206 may be triangular in shape. For example, the side panels 1206 may be right triangular in shape. In an embodiment, the front panel 1204 is offset from the opening 116 to cover the track 110 (not illustrated in FIGS. 12A and 12B). In such an embodiment, the front panel 1204 is angled to cover the track 110 and couple to the frame 102 and/or horizontal crossbar 104 leaving gaps on the sides, and the side panels 1206 close the gaps on the sides to fully close the opening 116. The door 1202 may be particular useful for an outdoor application to secure the revolving photography studio 100. While a particular embodiment of the door 1202 is illustrated in FIGS. 12A and 12B, the revolving photography studio 100 may include other doors without departing from the spirit or scope of the present disclosure. For example, if the track 110 is not enclosed by the door 1202, a door with only a front panel 1204 and no side panels 1206 may be used to close the opening 116.

While not illustrated in the figures, the revolving photography studio 100 may have other features. For example, the revolving photography studio 100 may comprise a ramp that covers the track 110 at the opening 116 to protect the track 110 from the weight of the automobile. In another example, the revolving photography studio 100 may comprise a laser or some other visual cue to act as a visual aid to show the automobile where to position itself within the revolving photography studio 100 for optimal pictures. In yet another example, the frame 102 of the revolving photography studio 100 may lock to the track 110. This would prevent the revolving photography studio 100 from getting knocked off the track by weather conditions for example if the revolving photography studio 100 is outdoors. In an additional example, the revolving photography studio 100 may comprise a blower for the rain if the revolving photograph studio 100 is outdoors. The blower may be coupled to the frame 102 such as via one or more of the plurality of bolt holes 402 on the horizontal crossbar 104.

Figure 13:
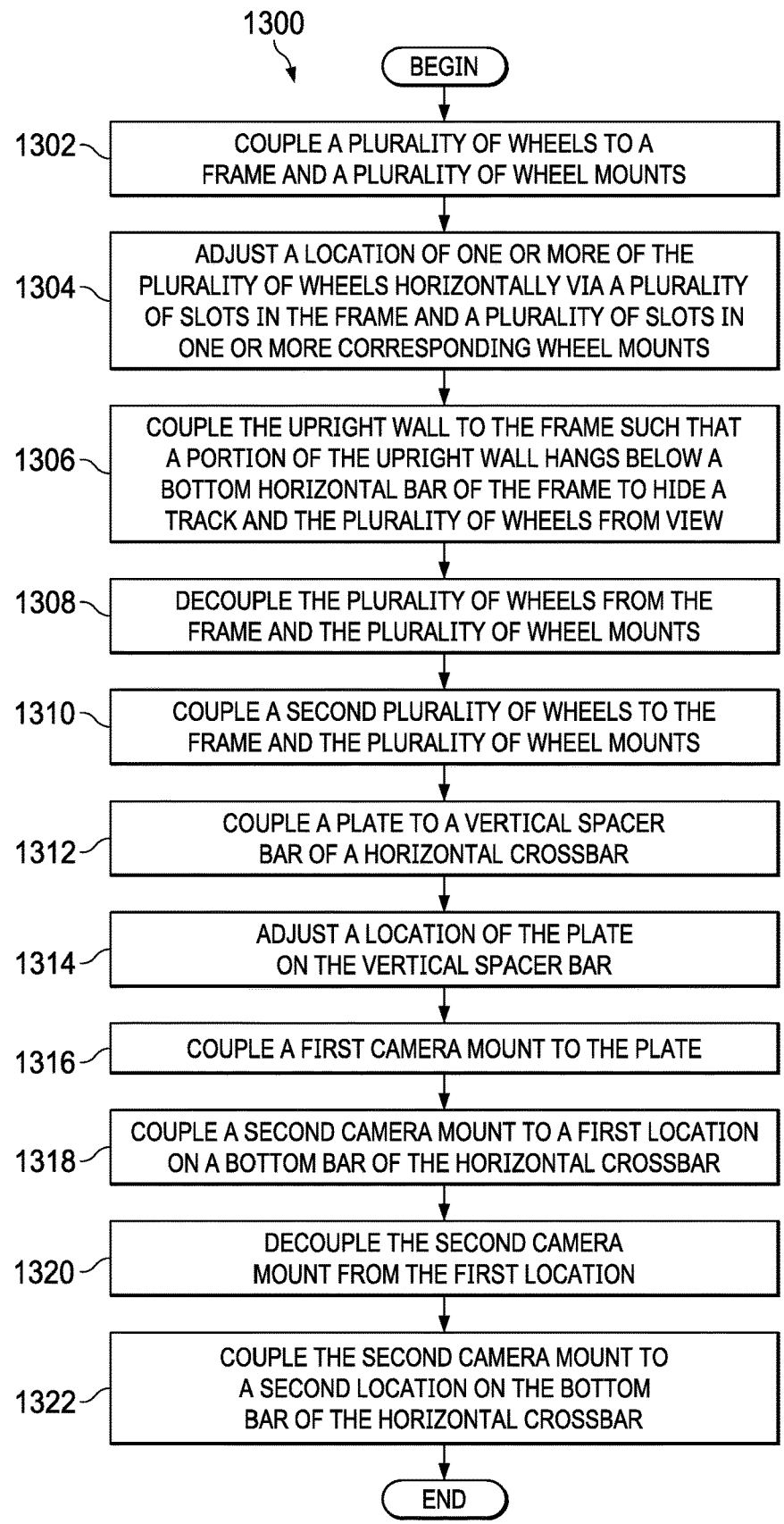
FIG. 13 is a flowchart of a method according to an embodiment of the disclosure.

Turning now to FIG. 13, a method 1300 of assembling a revolving photography studio (e.g., revolving photography studio 100) at an install location is described. At block 1302, a plurality of wheels (e.g., removable wheels 142) are coupled to a frame (e.g., frame 102) and a plurality of wheel mounts (e.g., wheel mounts 144). At block 1304, a location of one or more of the plurality of wheels are adjusted horizontally via a plurality of slots (e.g., slots 902) in the frame and a plurality of holes/slots in one or more corresponding wheel mounts. At block 1306, an upright wall (e.g., upright wall 106) is coupled to the frame such that a portion of the upright wall hangs below a bottom horizontal bar (e.g., bottom horizontal bar 112a) of the frame to hide a track (e.g., track 110) and the plurality of wheels from view.

At block 1308, the plurality of wheels are decoupled from the frame and the plurality of wheel mounts. At block 1310, a second plurality of wheels are coupled to the frame and the plurality of wheel mounts. In an embodiment, the plurality of wheels and the second plurality of wheels are different sizes.

At block 1312, at least a portion of a plate (e.g., plate 124) is coupled to a vertical spacer bar (e.g., vertical spacer bar 120) of a horizontal crossbar (e.g., horizontal crossbar 104). At block 1314, a location of the plate on the vertical spacer bar is adjusted. At block 1316, a first camera mount (e.g., first camera mount 128) is coupled to the plate. In an embodiment, the first camera mount is coupled to the plate via a plurality of bolt holes on the plate (e.g., plurality of bolt holes 202). In an alternative embodiment, the first camera mount is magnetically coupled to the plate.

At block 1318, a second camera mount (e.g., second camera mount 132) is coupled to a first location on a bottom bar (e.g., bottom bar 118*b*) of the horizontal crossbar. In an embodiment, the second camera mount is coupled to the bottom bar of the horizontal crossbar via a plurality of bolt holes on the bottom bar (e.g., plurality of bolt holes 402). In an alternative embodiment, the second camera mount is magnetically coupled to the bottom bar. At block 1320, the second camera mount is decoupled from the first location. At block 1322, the second camera mount is coupled to a second location on the bottom bar of the horizontal crossbar.

One or more of the blocks in FIG. 13 may be omitted. Additionally, the blocks in FIG. 13 may occur in a different order than is represented in the flowchart.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A revolving photography studio, comprising:
   a stationary circular track surrounding a product setup location, the stationary circular track comprising a plurality of magnetic indexers;
   an upright wall coupled to a frame defining a studio backdrop, being of a curved configuration, at least partially surrounding the product setup location, and following the stationary circular track for undergoing revolvable movement along the track using removable wheels, wherein the wall comprises a defined opening for entrance into the product setup location;
   a horizontal crossbar across a top of the opening and coupled to the frame;
   a plurality of wheel mounts coupled to the frame configured to receive the removable wheels; wherein each of the plurality of wheel mounts comprises a magnet, and
   at least one camera mount coupled to the horizontal crossbar, wherein the plurality of magnetic indexers on the stationary circular track and each magnet in the plurality of wheel mounts allow the revolving photography studio to stop at predefined locations to capture photographs with at least one camera coupled to the at least one adjustable camera mount.

2. The revolving photography studio of claim 1, wherein the at least one camera mount is a remote controlled adjustable camera mount, and wherein the at least one camera is adjusted via the remote controlled adjustable camera mount based on a particular predefined location at which the revolving photography studio is stopped.

3. The revolving photography studio of claim 2, wherein the horizontal crossbar is a linear horizontal crossbar and comprises a top bar, a bottom bar, and a vertical spacer bar between the top bar and the bottom bar.

4. The revolving photography studio of claim 3, wherein the horizontal crossbar comprises other vertical bars, and wherein the vertical spacer bar is wider than the other vertical bars.

5. The revolving photography studio of claim 4, further comprising a plate coupled to the vertical spacer bar, wherein the vertical spacer bar comprises one or more individual bars.

6. The revolving photography studio of claim 1, further comprising one or more lights coupled to the studio backdrop that revolve with the studio backdrop.

7. A revolving photography studio, comprising:
   a stationary circular track surrounding a product setup location,
   an upright wall coupled to a frame defining a studio backdrop, being of a curved configuration, at least partially surrounding the product setup location, and following the stationary circular track for undergoing revolvable movement along the track using removable wheels, wherein the wall comprises a defined opening for entrance into the product setup location; and
   a plurality of wheel mounts coupled to the frame configured to receive the removable wheels, wherein each of the plurality of wheel mounts and each portion of the frame coupled to the plurality of wheel mounts comprise a plurality of slots, and wherein the plurality of slots are of a size that enable the removable wheels to be adjusted horizontally.

8. The revolving photography studio of claim 7, wherein the frame comprises a plurality of horizontal bars in the curved configuration including a top horizontal bar, a bottom horizontal bar, and a middle horizontal bar between the top horizontal bar and the bottom horizontal bar, and wherein the plurality of wheel mounts are coupled to the bottom horizontal bar.

9. The revolving photography studio of claim 8, wherein the frame further comprises a plurality of vertical bars from the top horizontal bar to the bottom horizontal bar, and wherein the upright wall extends past the bottom horizontal bar to minimize a gap between the upright wall and a floor of the product setup location and to hide the removable wheels.

10. The revolving photography studio of claim 8, further comprising a ceiling coupled to the top horizontal bar of the frame, the ceiling at least partially encloses the product setup location.

11. The revolving photography studio of claim 7, wherein each removable wheel is coupled to the plurality of slots via a wheel bracket.

12. The revolving photography studio of claim 7, further comprising a linear horizontal crossbar across a top of the opening and coupled to the frame.

13. The revolving photography studio of claim 12, wherein the linear horizontal crossbar comprises a top bar, a bottom bar with a plurality of bolt holes, and a plurality of vertical bars between the top bar and the bottom bar, and further comprising an adjustable camera mount coupled to the bottom bar via one of the plurality of bolt holes.

14. A revolving photography studio, comprising:
- a stationary circular track surrounding a product setup location,
- an upright wall coupled to a frame defining a studio backdrop, being of a curved configuration, at least partially surrounding the product setup location, and following the stationary circular track for undergoing revolvable movement along the track using wheels, wherein the wall comprises a defined opening for entrance into the product setup location;
- a linear horizontal crossbar across a top of the opening and coupled to the frame; and
- a plate coupled to the linear horizontal crossbar, wherein the plate is configured to receive a camera mount.

15. The revolving photography studio of claim 14, wherein the linear horizontal crossbar comprising a top bar, a bottom bar, and a vertical spacer bar between the top bar and the bottom bar, and wherein the plate is coupled to the vertical spacer bar.

16. The revolving photography studio of claim 15, wherein the vertical spacer bar is at a center of the linear horizontal crossbar and comprises at least two individual bars.

17. The revolving photography studio of claim 16, wherein the linear horizontal crossbar comprises a plurality of other vertical bars between the top of the linear horizontal crossbar and a bottom of the horizontal crossbar, and wherein the vertical spacer bar is wider than the plurality of other vertical bars.

18. The revolving photography studio of claim 14, wherein the plate comprises a plurality of bolt holes, and wherein the camera mount couples to the plate via any of the bolt holes.

19. The revolving photography studio of claim 14, further comprising one or more camera mounts coupled to at least one of the linear horizontal crossbar or the frame.

20. The revolving photography studio of claim 14, further comprising one or more battery powered lights coupled to the studio backdrop that revolve with the studio backdrop.

\* \* \* \* \*